United States Patent
Gorczyca (10) Patent No.: US 12,492,798 B2
(45) Date of Patent: Dec. 9, 2025

(54) LIGHT GUIDE DESIGNED FOR USE IN A VEHICLE

(71) Applicant: PO Lighting Czech, s.r.o., Senov u Noveho Jicina (CZ)

(72) Inventor: Aleksandra Gorczyca, Senov u Noveho Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 19/002,960

(22) Filed: Dec. 27, 2024

(65) Prior Publication Data

US 2025/0216050 A1 Jul. 3, 2025

(30) Foreign Application Priority Data

Dec. 27, 2023 (EP) .................................... 23220243

(51) Int. Cl.
*F21S 43/241* (2018.01)

(52) U.S. Cl.
CPC .................................. *F21S 43/241* (2018.01)

(58) Field of Classification Search
CPC ... B60Q 1/26; F21S 43/40; F21S 43/33; F21S 43/239; F21S 43/249; F21S 43/241
See application file for complete search history.

(56) References Cited

U.S. PATENT DOCUMENTS

| | | |
|---|---|---|
| 7,543,971 B2 | 6/2009 | Lee et al. |
| 2016/0116657 A1 | 4/2016 | Nakashima et al. |
| 2021/0062993 A1 | 3/2021 | Buisson et al. |
| 2022/0099266 A1 | 3/2022 | Ahn et al. |
| 2023/0128040 A1 | 4/2023 | Baek |

FOREIGN PATENT DOCUMENTS

| | | | |
|---|---|---|---|
| CN | 216783452 U | 6/2022 | |
| DE | 102023122482 A1 * | 2/2025 | ............ F21S 43/265 |
| EP | 2735789 A2 | 5/2013 | |

OTHER PUBLICATIONS

Innovation (Year: 2025).*
European Search Report dated May 30, 2024 for the Priority Application EP23220243.

* cited by examiner

*Primary Examiner* — Anabel Ton (57) ABSTRACT

A light guide fitting a vehicle panel seen by a viewer facing said panel. The light guide features an overall planar shape with at least one edge equipped with optical interfaces intended to accommodate light sources, such as LEDs, directed towards the light guide in an illumination direction. It also comprises multiple through-hole sections arranged in rows that extend parallel to the illumination direction. The optical interfaces are positioned in locations on the edge that do not overlap with the projections of the through-hole sections onto the edge in the illumination direction. At least one of the through-hole sections has a frustoconical cross-section in any plane perpendicular to the illumination direction, the apex of the corresponding cone being located opposite the observation face when the light guide is fitting the vehicle panel. A grill lamp and a body panel comprising such a grill lamp are also disclosed.

10 Claims, 10 Drawing Sheets

LIGHT GUIDE DESIGNED FOR USE IN A VEHICLE

TECHNICAL FIELD

The technical field of the invention is illuminating devices for vehicles, in particular for vehicle exterior panels.

BACKGROUND OF THE INVENTION

Exterior panels of vehicles tend to be decorated and illuminated to render communication services, improve visibility or for aesthetic purposes.

However, illuminating panels requires numerous light sources and complex devices made of a high number of parts, leading to an increase of the cost of the vehicle.

U.S. Pat. No. 7,543,971 discloses a planar light guide for use in a keypad, providing an illumination of the keys with a small number of light sources.

Such a light guide offers the advantage of reducing the number of light sources, compared with the number of illuminated keys. It is not adapted to exterior panels and has never been disclosed as adaptable to this application.

TECHNICAL PROBLEM TO BE SOLVED

With the purpose of offering a solution to illuminate a big area of an exterior panel, with a patterned lit appearance and a limited number of parts, the invention makes use of a two-dimensional light guide that has been adapted appropriately.

According to the invention, the use of a two-dimensional light guide makes it possible to obtain a slim illuminated panel.

Additionally, the position of the light sources and the arrangement of the two-dimensional light guide reduces the effect of the positioning of the light sources, i.e. increase the tolerance for loose positioning of the light sources.

SUMMARY OF THE INVENTION

An object of the invention is a light guide designed to fit a vehicle panel, said light guide having a sheet shape with a predetermined thickness and at least one edge equipped with in-coupling surfaces able to accommodate light sources, such as LEDs, directed towards the light guide in a source-to-guide direction, characterized in that said sheet-shaped light guide comprises a plurality of through-holes along the thickness of the sheet-shaped light guide and wherein the in-coupling surfaces are positioned in locations on the edge and at a distance with the projections of the through-holes in the source-to-guide direction, and in that a cross-section of at least one of the through-holes has a varying width along the thickness of the light guide.

In the present description, the following terms are used with the following meanings:
  sheet shape: a three-dimensional shape with one dimension out of three significantly smaller than the two other dimensions. The smaller dimension is called thickness. The shape is delimited by two large surfaces, named faces, and one narrow peripheral surface, named edge. The faces are not necessarily planar. For instance, they can be curved. Because of the narrowness of the edge, the faces are globally parallel,
  vehicle panel: exterior or interior vehicle body part, usually visible to an observer looking at it, if necessary, after removal of another covering part,
  observation face of an object: face intended to be seen by an observer looking at the object,
  source-to-guide direction: the main direction of a beam propagating from the light sources into the light guide, after coupling in at the in-coupling surfaces on the edge of the light guide, and
  projection of the through holes in a direction: the intersection of lines passing through the holes and parallel to the direction with any surface not containing the direction.

The exterior panel can be, for instance, a front grill.

According to a particular embodiment, the through holes are arranged in columns that extend parallel to the source-to-guide direction. This renders a specific visual effect.

According to a particular embodiment, at least some, preferably all, of the through-holes have an elongated shape with a widest dimension in the source-to-guide direction.

According to a particular embodiment, the vehicle panel has an observation face, i.e. a face intended to be seen by an observer looking at the vehicle, and the cross-section of at least one of the through-holes has an increasing width along the thickness of the light guide when moving towards the observation face. In this embodiment, the brightness of the illumination can be increased because light is decoupled from all the through holes in the same direction. A diffusive screen can then be located on one side of the light guide and diffuse a bright light.

One advantage of the elongated shape is to provide wider light channels in the light guide for propagating light. Another advantage is a better decoupling of the light and, therefore, a possibility to add milky filters, masks, or a combination of both.

The elongated shape can have an elliptic or a rectangular cross section in a plane parallel to the two-dimensional light guide. This choice depends on the targeted visual effect.

According to a particular embodiment, at least one of the through holes has a frustoconical cross section. This helps orientating the decoupled lights rays towards the observation face progressively and uniformly, thus illuminating the observation face of the panel.

According to a particular embodiment, the in-coupling surface is a curved structure collimating light through the curve.

According to another particular embodiment, the in-coupling region has an optical element, collimating the light into the light guide.

According to a particular embodiment, the through holes are arranged in a matrix pattern.

Another object of the invention is a grill lamp for a vehicle body panel, comprising a light guide as described above and a set of light sources mounted next to in-coupling surfaces able to accommodate light sources and oriented so as to be directed parallel to the source-to-guide direction.

The grill lamp may comprise a frame, possibly of a rectangular shape, surrounding the light guide and accommodating the light sources.

In a particular embodiment, the grill lamp comprises a diffusive screen made of a different diffusive material from the light guide and located next to the light guide. The diffusive screen may be coloured differently in locations facing the plain surface of the light guide and in locations facing the through-hole sections of the light guide.

In a particular embodiment, the diffusive screen is coloured differently in locations facing the plain surface of the light guide and in locations facing the through-hole sections of the light guide.

Thanks to the invention, the limited number of light sources can be addressable and controlled to create a light animation on the panel.

Other advantages of the light guide according to the invention are:
- the absence of collimating features brings tolerance regarding the positioning of the light sources,
- the use of one large light guide reduces the need of an assembling process and avoids the cost of assembly tools,
- the required pattern of through holes can be obtained by moulding,
- a painting can be added on a portion of the light guide to create a frame, thus further reducing the number of parts,
- no masking parts are needed in the composition of the panel,
- the panel is adapted to very slim locations,
- the illuminated panel has a good homogeneity for high angular views, and
- although the number of light sources is limited, partial addressability of the light sources allows some animation with a good homogeneity.

Other objects of the invention are a vehicle body panel fitted with a light guide according to the invention and a vehicle body panel comprising a grill lamp according to the invention.

BRIEF DESCRIPTION OF THE DRAWINGS

The invention will be better understood by reading the description of the following non-limiting examples, illustrated by the following figures:

FIG. 17 is a cross section along plane B-B of yet another embodiment of the light guide.

DETAILED DESCRIPTION OF THE INVENTION

The grill lamp represented on the drawings is intended to cover a large area of a vehicle body panel, for instance at the front of a vehicle. Its function is to illuminate the panel in an original way. The grill lamp in this embodiment of the invention is a slim object with a small footprint, that can be located at the front of a vehicle. In this example, when an observer is looking at the vehicle, he or she can see the front face of the vehicle. The front face of the grill lamp visible by the observer, as well as any constituting part of the grill lamp, has an observation face directed towards the exterior of the vehicle (forward direction Z of the vehicle) and a hidden face directed towards the interior of the vehicle (rearward direction −Z of the vehicle).

Figure 1:
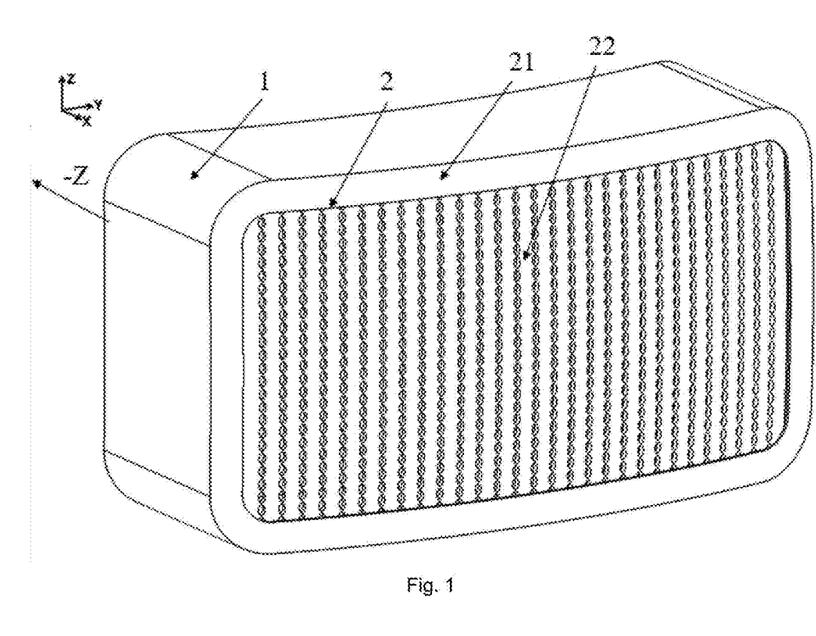
FIG. 1 is a perspective view of a real grill lamp according to a first embodiment of the invention.
Figure 2:
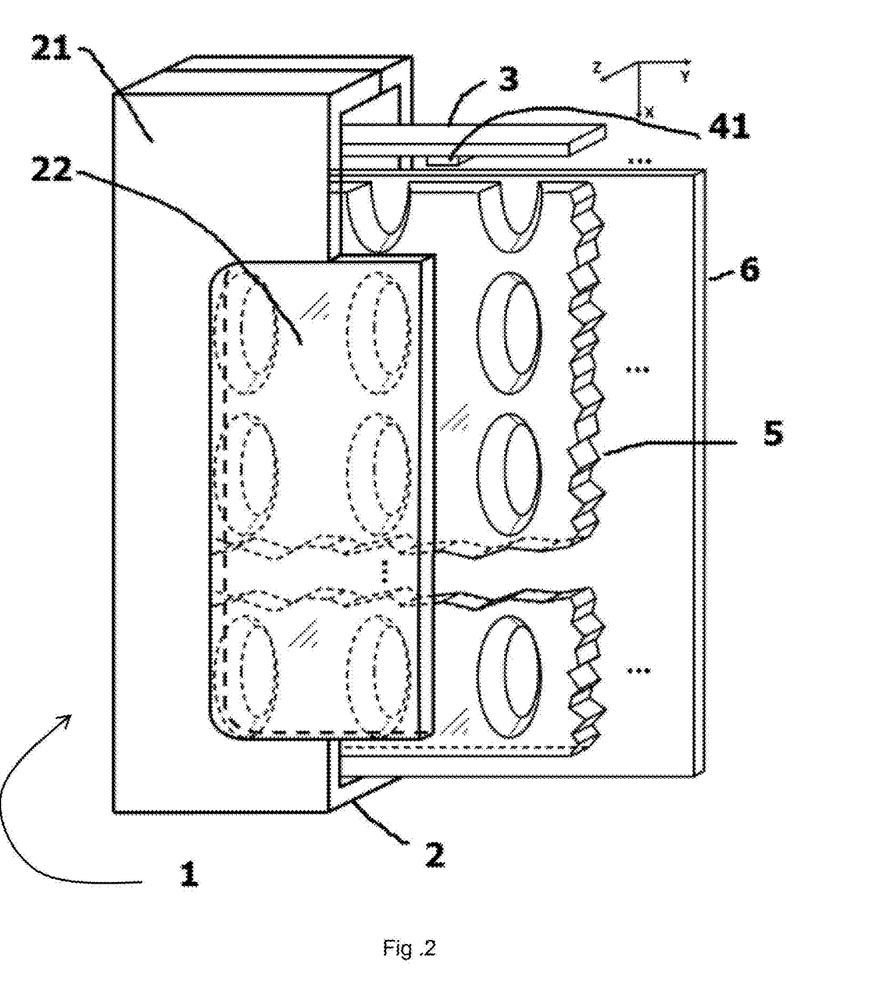
FIG. 2 is a partial and schematic representation of the grill lamp of FIG. 1.

In FIG. 2, all parts are shown. The grill lamp comprises an opaque housing 1, and 2K outer lens 2 which are connected and form a cavity between them. Outer lens 2 consist of an opaque portion 21 and a translucent portion 22. In the cavity between housing 1 and outer lens 2, a set of LEDs, serving as light sources, 41 is populated on at least one PCB 3. Light sources 41 are hidden behind opaque portion 21 of outer lens 2 to prevent direct illumination of the outer lens and are oriented transversally to the optical axis. A sheet-shaped light guide 5 with an overall planar shape is a planar or curved sheet following the curvature of outer lens 2.

Frame X, Y, Z respectively represents the vertical, transversal and longitudinal directions of the vehicle when the grill lamp is mounted on it.

Figure 4:
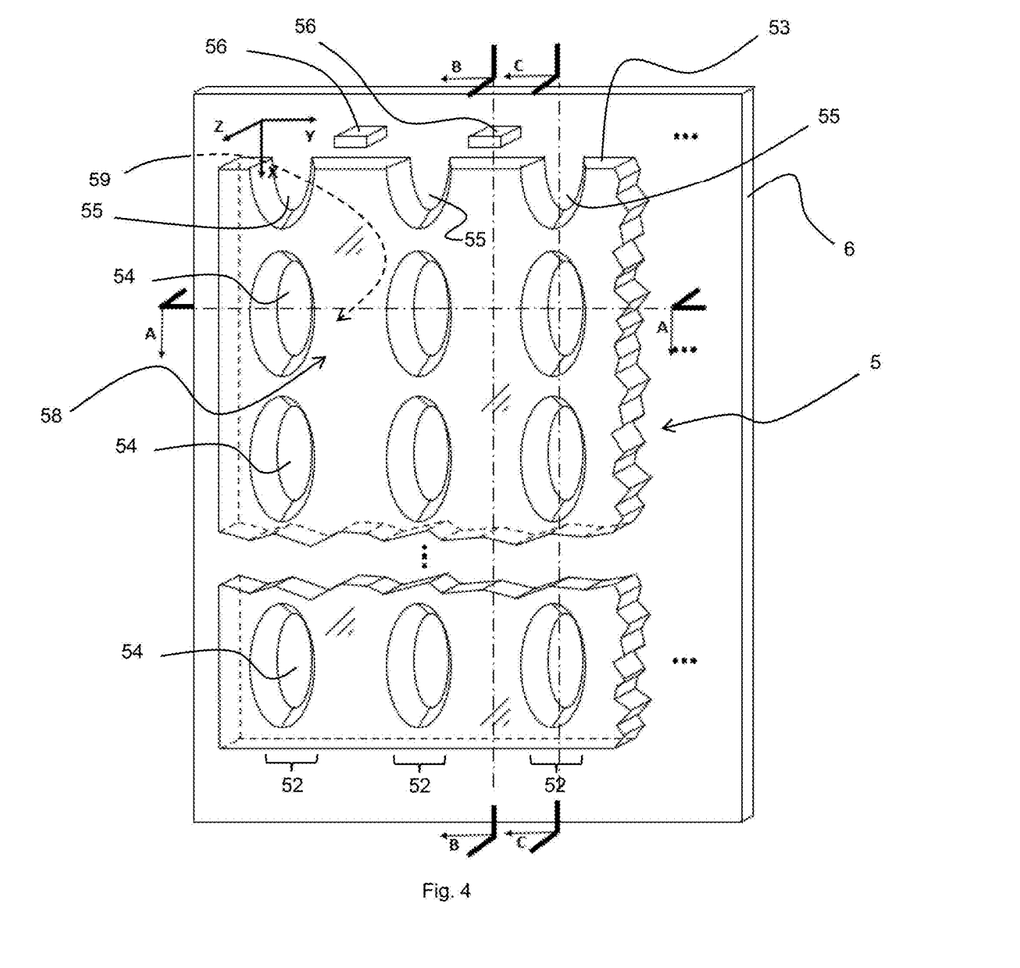
FIG. 4 is a perspective view of the light guide according to a first embodiment.

Light guide 5 has a sheet shape, meaning that it is has a three-dimensional shape in X, Y and Z directions, with Z dimension significantly smaller than X and Y dimensions. Z dimension is called thickness. As shown in FIG. 4, a narrow peripheral surface of the light guide 5 is its edge 53. Front 58 and back 59 surfaces of the light guide are faces larger than edge 53. The front face is also named observation face 58. The faces are curved and globally parallel to each other.

Light guide 5 is placed backward parallel to outer lens 2 and is configured to receive light from light sources 41, either directly on in-coupling surface of edge 53, as shown in FIG. 2, or through optical elements 56 located at its upper edge 53, as shown in FIG. 4. The absence or presence of optical elements 56 depends on the embodiment. The other features of the invention described are not affected by this variation.

The optical elements 56 are performing the collimation of the light emitted by the light sources 41 into the light guide 5. As previously mentioned, in alternative embodiments, the LED light source 41 is directly mounted on in-coupling surface of edge 53.

Light emitted by light sources 41 flows from optical elements 56 into the light guide 5 in a source-to-guide direction that is parallel to axis X in the drawings. Light is coupled into the light guide 5 and guided inside through total internal reflection, as will be explained in reference to FIGS. 11 and 12.

A diffusive screen 6 is placed backward, parallel to back face 59 of light guide 5, and is following the shape of the light guide back face 59. Diffusive screen 6 keeps small distance to light guide 5 or is in physical contact with it, but it is a separate part made of a diffusive material.

Figure 3:
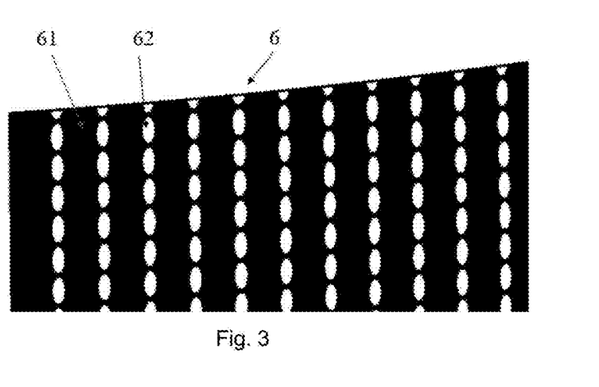
FIG. 3 is a perspective view of a diffusive screen.

As shown in FIG. 3, the front face, i.e. observation face 58, of diffusive screen 6 is patterned with a coloured printing 61 that darkens most of the screen except on ovals 62 aligned in columns parallel to X direction. Accordingly, diffusive screen 6 is able to diffuse light in the ovals 62 and absorb light elsewhere of its observation face. The printed colour may be black or any other colour matching with the expected aesthetic effect. The non printed ovals 62 of screen 6 can also be white printed to enhance the visual effect.

As shown by FIG. 4, in the light guide 5, a set of frustoconical holes 54 are created. They are obtained during the moulding of the light guide. Their conical shape is clearly compatible with an unmoulding step of the manufacturing. Holes 54 are crossing the light guide 5 along its thickness, in the Z direction. Holes 54 are arranged in perforation columns 52 between the light sources 41 and optical elements 56. Perforation columns 52 extend parallel to the source-to-guide direction (i.e. X direction). Holes 54 are elongated along the light guide body 5 with a widest dimension in the source-to-guide direction X. They have an elliptic cross section in any plane parallel to the light guide, i.e. parallel to X and Y directions.

Figure 14:
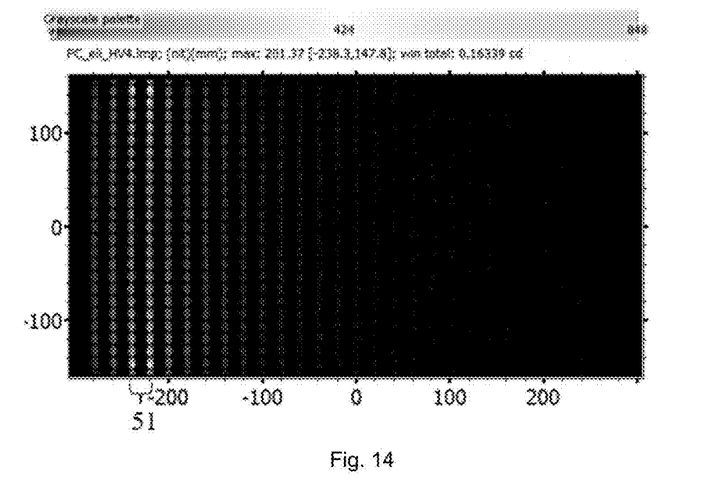
FIG. 14 is a view of the observation face of the grill lamp with the complete set of LEDs on, FIG. 15 is a view of the observation face of the grill lamp with only one LED on, FIG. 16 is a cross section along plane B-B of another embodiment of the light guide.
Figure 15:
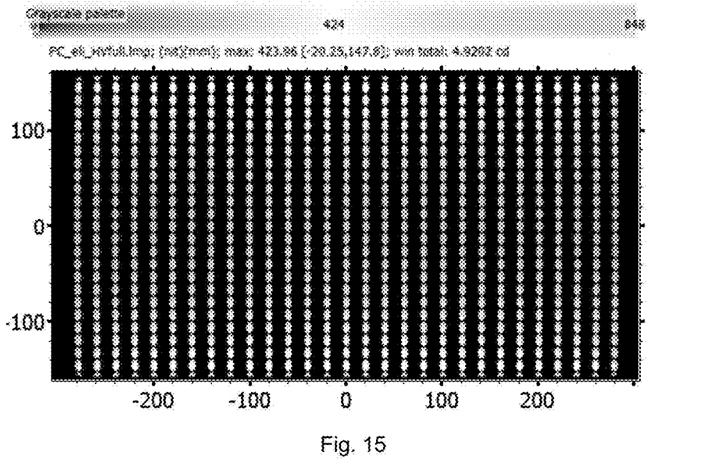

Holes 54 are facing non-printed ovals 62 of diffusive screen 6 and printed portions 61 of diffusive screen 6 are facing the solid portions of back face 59 of light guide 5. This will enhance the impression of patterned lit appearance and expand it also for unlit appearance, as shown in FIGS. 14 and 15.

Figure 10:
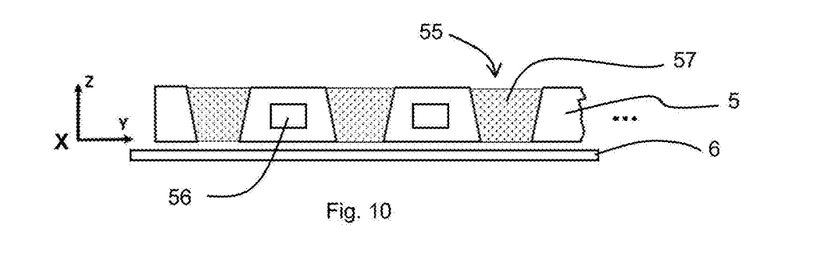
FIG. 10 is a top-view of the light guide showing the projection of the through holes on the upper edge of the light guide.

All of the aligned holes 54 have projections along the source-to-guide (or X) direction. Projections intersect edge 53 and delimit projection areas 57 of edge 53, as shown in FIG. 10. In this embodiment, projection area 57 (grey coloured for a better understanding in FIG. 10) belong to the upper half holes 55 intersecting edge 53. Projection areas 57 are distinct from the locations of optical elements 56 and LEDs 41. They are at a distance with optical elements 56 in the source-to-guide direction X.

Figure 8:
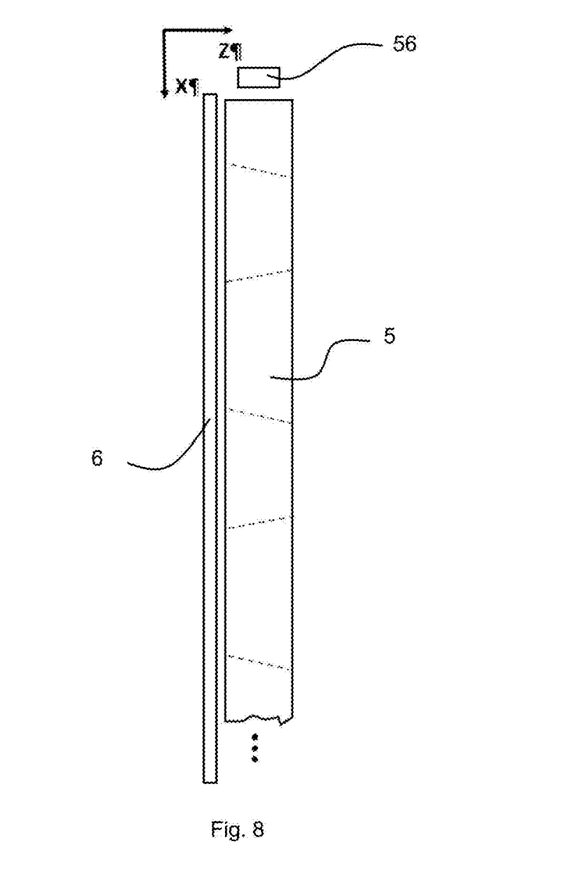
FIG. 8 is a cross section along plane B-B.
Figure 9:
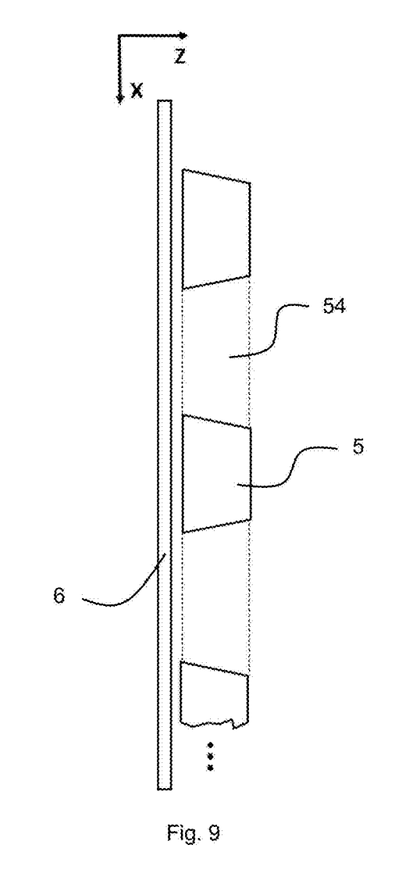
FIG. 9 is a cross section along plane C-C.

In FIG. 9, cross-section C-C, taken in a plane of FIG. 4 parallel to Z and X directions and intersecting the axis of one perforation column 52, shows the cut holes 54. Cross-section B-B of FIG. 8, taken in another plane of FIG. 4 parallel to Z, X directions and intersecting optical elements 56, is solid from top to bottom. Dotted lines show the cut holes 54 through the transparency.

Figure 5:
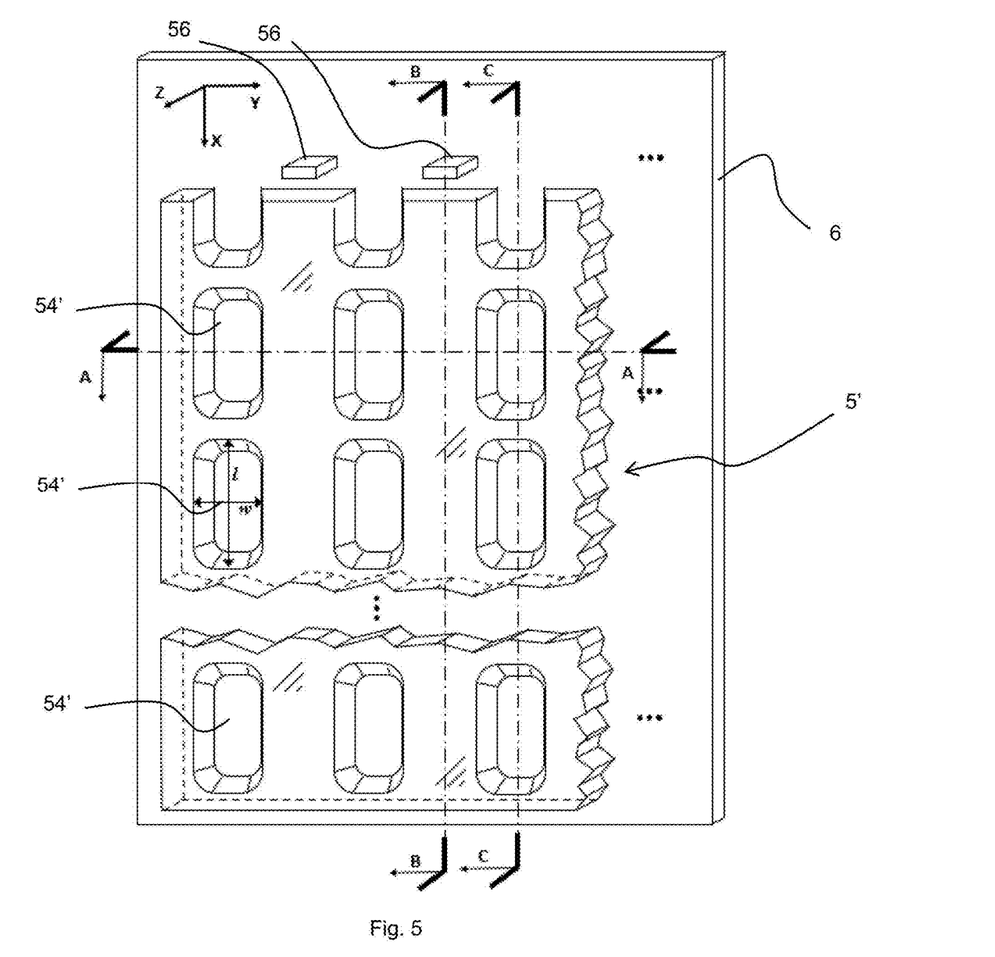
FIG. 5 is a perspective view of the light guide according to a second embodiment.

FIG. 5 shows another embodiment of the light guide 5', with frustoconical elongated holes 54' having a rectangular cross-section in any plane parallel to the light guide, i.e. parallel to X and Y directions. The cross-section of the holes 54' modifies the visual aspect of the illumination of the grill lamp. It is thus decided to meet the aesthetical expectations of a designer.

Apart from the cross-section, holes 54' are arranged as holes 54 of the previous embodiment, in columns parallel to X direction, with their greatest dimension "I" parallel to X direction, and their smallest dimension "w" perpendicular to X direction. The projections of holes 54' on edge 53 are also restricted to projection areas 57 that are spaced apart optical elements 56. With a light guide 5' having rectangular cross-section holes 54', diffusive screen 6 may also be modified by replacement of clear or white ovals 62 with clear or white rectangles (not shown).

In the embodiments of FIGS. 4 and 5, the matrix arrangement of holes 54 and 54' creates rows, along the Y direction, in addition to columns in the X direction. Such rows are part of the resulting visual effect of the grill lamp in lit state, but not part of the technical effect of the invention.

Figure 6:
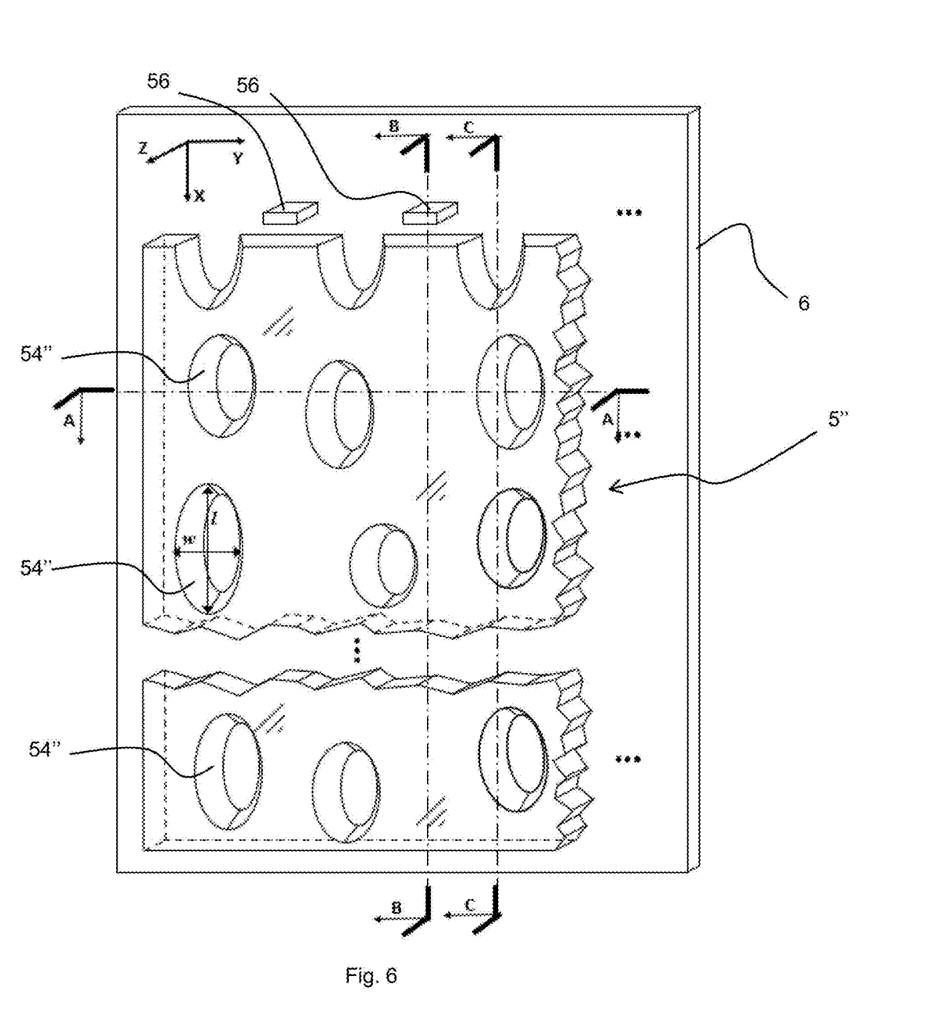
FIG. 6 is a perspective view of the light guide according to a third embodiment.
Figure 7:
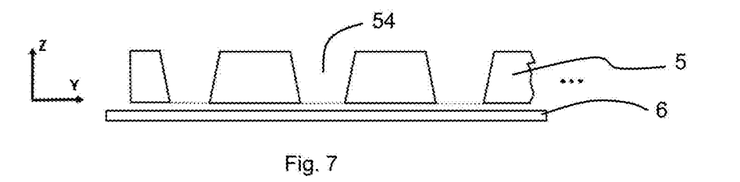
FIG. 7 is a cross section along plane A-A.

In FIG. 6, holes 54" have irregular shapes. They are frustoconical and elongated along the X direction, with their greatest dimension "I" parallel to X direction, and their smallest dimension "w" perpendicular to it, but they are not arranged in rows and columns. However, the projections of all the holes 54" onto edge 53 of the light guide 5", along the source-to-guide direction X, are also restricted to projection areas 57 that do not overlap the locations of optical elements 56.

Figure 11:
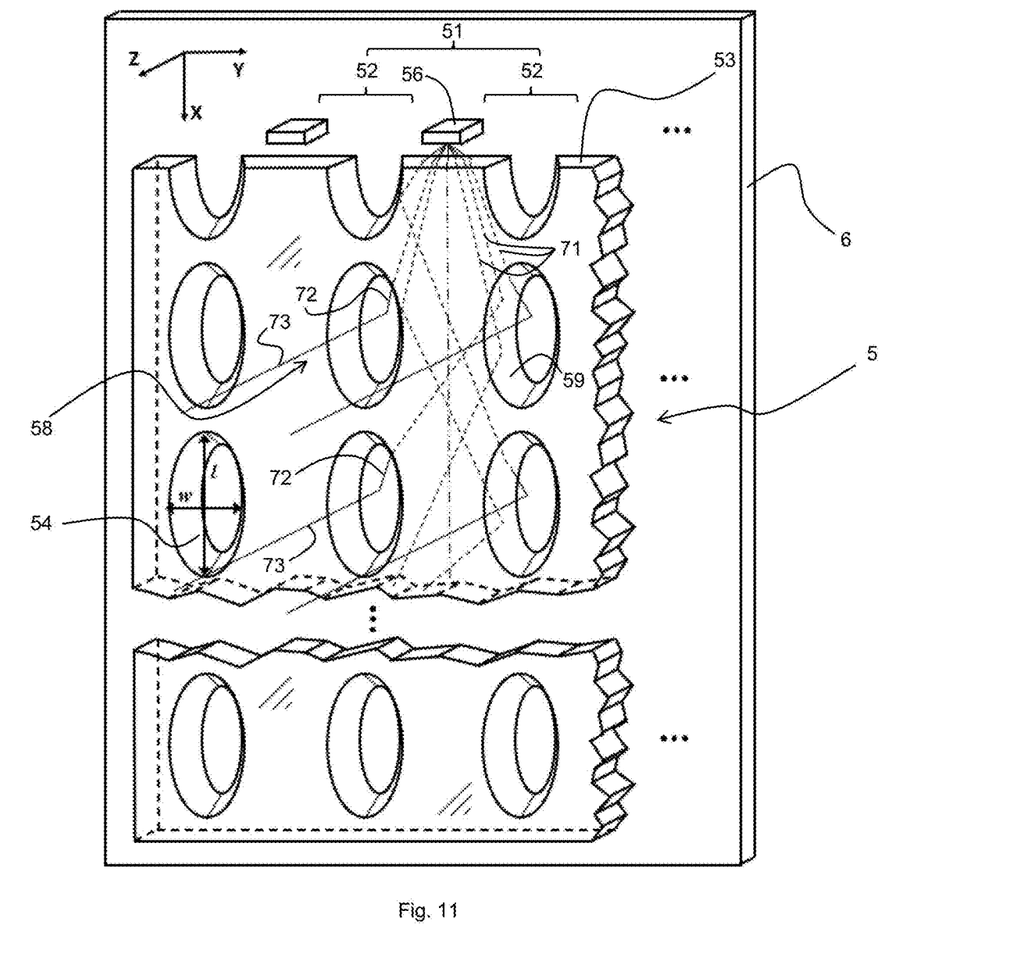
FIG. 11 shows, in the light guide of FIG. 4, the propagation of light emitted by the light sources.
Figure 12:
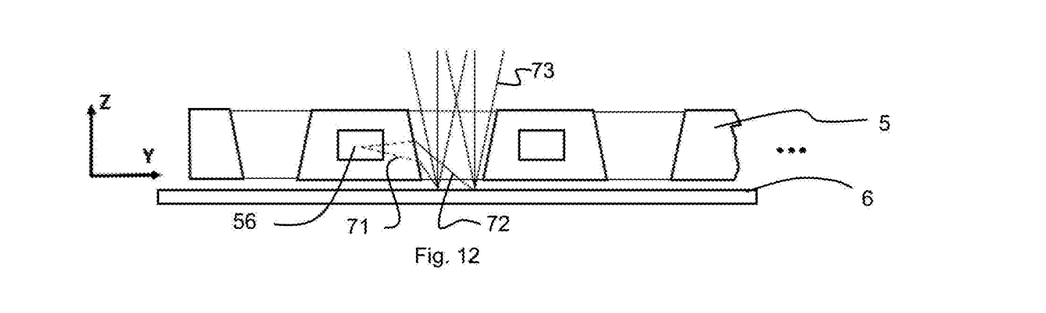
FIG. 12 shows, in the light guide of FIG. 10, the propagation of light emitted by the light sources.

Accordingly, light guides 5, 5' and 5" propagate the light emitted by LEDs 41 in the same way, as explained now in reference to FIGS. 11 and 12.

Light rays 71 coupled into light guide 5 from light source 41 are guided inside a light channel 51. A light channel 51 overlaps two adjacent perforation columns 52 and the part of light guide 5 located between them. Coupling in of rays 71 occurs through total internal reflections on side walls 59 of holes 54. Addressability of the light channels 51 is then possible by operating separately each one of light sources 41. The resulting optical effect is shown in FIG. 14.

Part of rays 71 guided in light channels 51 are leaking through the hole side walls 59 out of light guide 5 and can reach the diffusive screen 6 in ovals 62 just behind light guide holes 54 or can be coupled again into the light guide. Rays 72 which are reaching diffusive screen 6 in ovals 62 are reflected and partially redirected as rays 73 towards clear portion of outer lens 2 to be visible to the observer at an observation face of the panel. In consequence, the main contribution of the light seen by the observer located in front of the observation face of the light guide 5 comes from ovals 62 of diffusive screen. So, the lit appearance is patterned as defined by perforation columns 52.

The interest of the technical features of light guide 5 is that holes 54 in sheet-shaped light guide 5 have double role. A first one is to light guide between perforation columns 52 causing the light channels 51 addressability. A second one is to partially decouple light in to the cavity created by holes 54. The decoupled light then is reflected towards the observer by white or clear portion 62 of diffusive screen 6. Light guide 5 itself is not producing any light perceived by the observer but only guides the light in the light channels 51 and provides it into the cavities created by the holes 54, 54', 54". Holes can be described as secondary light sources which are providing light to the patterned diffusive screen 6.

Figure 13A:
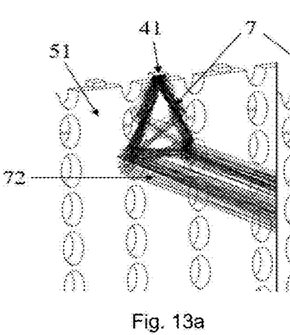
FIGS. 13a, 13b and 13c shows light rays propagating in the light guide and decoupling toward the diffusive screen.
Figure 13B:
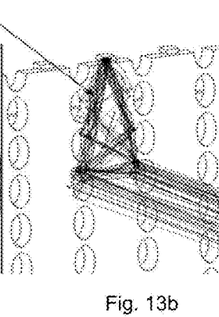
Figure 13C:
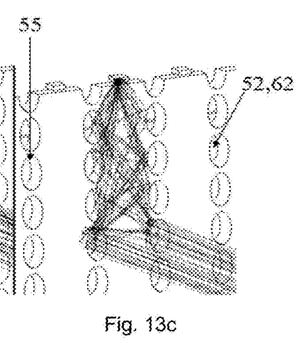

In FIG. 13, one can see a realistic propagation of light rays and their decoupling from the light guide when exiting the holes 54.

For the sake of clarify, light rays are represented separately in FIGS. 13a, 13b and 13c, but it should be understood that the propagated rays are superposed in the light guide.

In FIG. 13a, light emitted by LED 41 is coupled into the light guide and propagated in light channel 51. Most of the rays propagate in light channel 51 directly to the second row of holes. A few rays meet the side walls of two adjacent holes of the first row of holes and, because of incident angle, reflect totally towards second row holes. All the rays meeting the second row of holes decouple from the light guide because of their incident angle on the walls of the holes, as show in FIGS. 11 and 12. The rays then meet the clear or white ovals of the diffusive screen 6 and light is diffused towards the observation face, in the Z direction.

In FIG. 13b, light emitted by LED 41 mainly reaches third row holes (excluding the half-holes of the upper edge), apart for a few rays that are reflected by the side walls of the holes of the first and second rows of holes (excluding the half-holes of the upper edge). Then, light decouples in the third row, as show in FIGS. 11 and 12.

In FIG. 13c, light emitted from LED 41 is mainly reflected by side walls of the holes of preceding rows. The total reflection keeps light rays in the light channel, until the incident angle is such that light decouples from the light guide, in the fourth row of holes (excluding the half-holes of the upper edge).

The resulting optical effect of the grill lamp is illustrated by FIGS. 14 and 15, where one can see that light emitted from holes of a same column have the same brightness, thanks to the propagation in the light channels 51. However, each light channel 51 can be individually controlled by individual control of the LED 41 feeding the light channel 51.

Figures 16, 17:
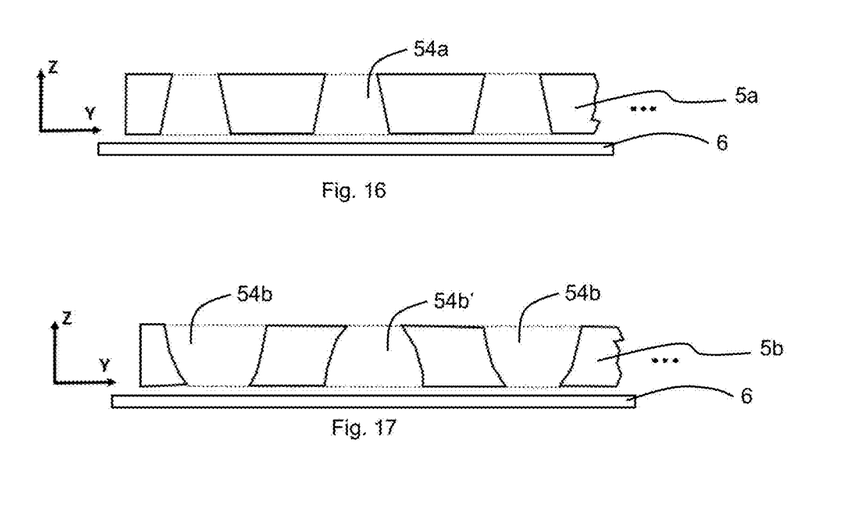

In the embodiment of FIG. 16, through holes 54a of light guide 5a have a frustoconical shape, as holes 54, 54' and 54" of the previous embodiments, but the apex of the cone is inverted. In other words, holes 54a are larger close to diffusing screen 6 than at the observation face. Again, the resulting aesthetic effect is changed, but the technical effect of the invention remains. It is a matter of aesthetic choice by the designer of the grill lamp.

In the embodiment of FIG. 17, the cross section of holes 54b and 54b' of light guide 5b is irregular. The shape of holes 54b and 54b' is not conical, but the width of the holes varies with the depth of the light guide, in Z direction. Again, the projection of holes 54b and 54b' onto the edge of the light guide, along source-to-guide direction X, is spaced apart the location of optical elements 56.

LIST OF REFERENCES

X: source-to-guide direction
1: . . . greatest dimension of holes
w: . . . smallest dimension of holes
1: . . . housing
2: . . . outer lens
21: . . . opaque portion
22: . . . translucent portion
3: . . . . PCB
41: . . . light sources, LEDs
5: . . . light guide
51: . . . light channels
52: . . . perforation columns
53: . . . edge
54, 54', 54", 54a, 54b: . . . through holes
55: . . . half holes
56: . . . optical elements
57: . . . projection area
58: . . . observation face
59: . . . hole side wall
6: . . . diffusive screen
61: . . . coloured printing
62: . . . ovals

The invention claimed is:

1. Light guide configured to be housed within an exterior vehicle panel, said light guide (5; 5'; 5"; 5a; 5b) having a sheet shape with a predetermined thickness and at least one edge (53) equipped with in-coupling surfaces able to accommodate light sources (41), such as LEDs, directed towards the light guide (5; 5'; 5"; 5a; 5b) in a source-to-guide direction (X), characterized in that said sheet-shaped light guide (5; 5'; 5"; 5a; 5b) comprises a plurality of through-holes (54; 54'; 54"; 54a; 54b, 54b') along the thickness of the sheet-shaped light guide (5; 5'; 5"; 5a; 5b) and wherein the in-coupling surfaces are positioned in locations on the edge and at a distance with the projections (57) of the through-holes (54; 54'; 54"; 54a; 54b, 54b') in the source-to-guide direction (X), and in that a cross-section of at least one of the through-holes (54; 54'; 54"; 54a; 54b, 54b') has a varying width along the thickness (Z) of the light guide.

2. Light guide according to claim 1, wherein the through holes (54; 54') are arranged in columns (52) that extend parallel to the source-to-guide direction (X).

3. Light guide according to claim 1, wherein at least one of the through-hole cross-sections has an elongated shape with a widest dimension ("I") in the source-to-guide direction (X).

4. Light guide according to claim 1, wherein the vehicle panel has an observation face (58), i.e. a face intended to be seen by an observer looking at the vehicle, and the cross-section of at least one of the through-holes (54; 54'; 54"; 54b) has an increasing width along the thickness of the light guide (5; 5'; 5"; 5a; 5b) when moving towards the observation face (58).

5. Light guide according to claim 1, wherein at least one of the through holes (54; 54'; 54"; 54a) has a frustoconical cross section.

6. Light guide according to claim 1, wherein the through holes are arranged in a matrix pattern.

7. Grill lamp for a vehicle body panel, characterized in that it comprises a light guide (5; 5'; 5"; 5a; 5b) according to claim 1 and a set of light sources (41) mounted next to the in-coupling surfaces able to accommodate light sources (41) and oriented so as to be directed parallel to the source-to-guide direction (X).

8. Grill lamp according to claim 7, comprising a diffusive screen (6) made of a different diffusive material from the light guide and located next to the light guide.

9. Grill lamp according to claim 8, wherein the diffusive screen (6) is coloured differently in locations (61) facing the plain surface of the light guide and in locations (62) facing the through-holes (54; 54'; 54"; 54a; 54b, 54b') of the light guide.

10. Vehicle body panel comprising a grill lamp according to claim 7.

* * * * *